United States Patent
Dong (10) Patent No.: US 12,232,153 B2
(45) Date of Patent: Feb. 18, 2025

(54) DATA TRANSMISSION METHOD AND APPARATUS AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 380 days.

(21) Appl. No.: 17/641,748

(22) PCT Filed: Sep. 10, 2019

(86) PCT No.: PCT/CN2019/105231
§ 371 (c)(1),
(2) Date: Mar. 9, 2022

(87) PCT Pub. No.: WO2021/046729
PCT Pub. Date: Mar. 18, 2021

(65) Prior Publication Data
US 2022/0304008 A1  Sep. 22, 2022

(51) Int. Cl.
*H04W 72/12* (2023.01)
*H04B 1/00* (2006.01)
(Continued)

(52) U.S. Cl.
CPC .......... *H04W 72/535* (2023.01); *H04B 1/401* (2013.01); *H04L 1/0006* (2013.01); *H04W 72/20* (2023.01); *H04W 72/52* (2023.01)

(58) Field of Classification Search
None
See application file for complete search history.

(56) References Cited

U.S. PATENT DOCUMENTS

2015/0312793 A1* 10/2015 Jeon .................. H04W 28/0205
370/329
2016/0113034 A1* 4/2016 Seok ..................... H04W 74/04
370/329
(Continued)

FOREIGN PATENT DOCUMENTS

CN 102387008 A 3/2012
CN 102948101 A 2/2013
(Continued)

OTHER PUBLICATIONS

David, Lopez-Perez et al. "IEEE 802.11be-Extremely High Throughput: The Next Generation of Wi-Fi Technology Beyond 802.11ax", arXiv:1902.04320v1 [cs.IT], Feb. 12, 2019, main body, pp. 2-3;Type-Y.

(Continued)

*Primary Examiner* — Sai Aung
(74) *Attorney, Agent, or Firm* — Volpe Koenig (57) ABSTRACT

A data transmission method, including: generating data frames for more than one transmission connections, the data frame includes a duration field. In the case of the transmission connection for the data frame being of a first type, duration indicated by the duration field includes transmission duration for the data frame but does not include transmission duration for a receiving feedback information; in the case of the transmission connection for the data frame being of a second type, duration indicated by the duration field includes transmission duration for the data frame and includes transmission duration for the receiving feedback information. The first type of transmission connection is configured to transmit the data frame. The second type of transmission connection is configured to transmit the data frame and the receiving feedback information. The transmission frequency bands for different transmission connec- (Continued)

tions are different, and sending the data frames using the transmission connections.

18 Claims, 5 Drawing Sheets

(51) Int. Cl.
*H04B 1/401* (2015.01)
*H04L 1/00* (2006.01)
*H04W 72/04* (2023.01)
*H04W 72/20* (2023.01)
*H04W 72/50* (2023.01)
*H04W 72/52* (2023.01)

(56) References Cited

U.S. PATENT DOCUMENTS

| | | | |
|---|---|---|---|
| 2016/0127108 A1 | 5/2016 | Jindal et al. | |
| 2016/0149685 A1 | 5/2016 | Rison | |
| 2016/0255656 A1* | 9/2016 | Lou | H04L 1/1887 370/335 |
| 2017/0063507 A1 | 3/2017 | Yan et al. | |
| 2017/0063509 A1 | 3/2017 | Kim et al. | |
| 2017/0280462 A1* | 9/2017 | Chun | H04W 84/04 |
| 2017/0302417 A1* | 10/2017 | Chun | H04L 1/0025 |
| 2018/0212738 A1* | 7/2018 | Chun | H04L 1/1685 |
| 2018/0359761 A1* | 12/2018 | Chun | H04W 72/21 |

FOREIGN PATENT DOCUMENTS

| | | |
|---|---|---|
| CN | 104350799 A | 2/2015 |
| CN | 104521304 A | 4/2015 |
| CN | 105577346 A | 5/2016 |
| CN | 107113112 A | 8/2017 |
| CN | 108123781 A | 6/2018 |
| EP | 3349505 A1 | 7/2018 |
| JP | 2009-525670 A | 7/2009 |
| KR | 20150051145 A | 5/2015 |
| WO | 2019/157996 A1 | 8/2019 |

OTHER PUBLICATIONS

Li Er bing, "Transmission Reliability Based on Data Link Layer Enhancement in Wireless Local Area Network", China Excellent Master's Thesis Full-text Database, Jun. 15, 2018, entire document; Type-A.

Seungho Ryu, et al. "A Block ACK Transmission Scheme for Reliable Multicast in IEEE 802.11 WLANs", 2016 IEEE Conference on Computer Communications Workshops (Infocom Wkshps, Apr. 14, 2016, entire document; Type-A.

* cited by examiner

DATA TRANSMISSION METHOD AND APPARATUS AND STORAGE MEDIUM

CROSS-REFERENCE TO RELATED APPLICATION

The present application is a U.S. National Phase Application of International Patent Application Serial No. PCT/CN2019/105231 filed on Sep. 10, 2019. The entire contents of the above-cited application are hereby incorporated by reference in their entirety for all purposes.

BACKGROUND

The Institute of Electrical and Electronics Engineers established a Study Group (SG) to study next generation of mainstream Wi-Fi technology, with the study scope being: 320 MHz-bandwidth Wi-Fi transmission, aggregation and collaboration technologies using more than one frequency bands, etc., and a proposed vision aims to improve a rate and a throughput capacity by at least four times compared with existing IEEE 802.11ax. Application scenarios of the new technology include video transmission, Augmented Reality (AR), Virtual Reality (VR), etc. The aggregation and collaboration technologies using more than one frequency bands refer to communication between Wi-Fi devices in frequency bands of 2.4 GHz, 5.8 GHz and 6-7 GHz at the same time.

SUMMARY

Examples of the disclosure provide a data transmission method and apparatus and a storage medium.

According to a first aspect of an example of the disclosure, there is provided a data transmission method, including:
  generating data frames for multi-links, in which the data frame includes a duration field;
  in the case of the link for the data frame being of a first type, duration indicated by the duration field includes transmission duration for the data frame but does not include transmission duration for a receiving feedback information;
  in the case of the link for the data frame being of a second type, the duration indicated by the duration field includes the transmission duration for the data frame and includes the transmission duration for the receiving feedback information;
  the first type of link is configured to transmit the data frame: the second type of link is configured to transmit the data frame and the receiving feedback information; and transmission frequency bands for different links are different; and
  sending the data frames using the links.

According to a second aspect of an example of the disclosure, there is provided a data transmission method, including:
  receiving data frames sent by multi-links. The data frame includes a duration field;
  in the case of the link for the data frame is of a first type, duration indicated by the duration field includes transmission duration for the data frame but does not include transmission duration for a receiving feedback information;
  in the case of the link for the data frame is of a second type, the duration indicated by the duration field includes the transmission duration for the data frame and includes the transmission duration for the receiving feedback information; and
  the first type of link is configured to transmit the data frame: the second type of link is configured to transmit the data frame and the receiving feedback information; and transmission frequency bands for different links are different.

According to a third aspect of an example of the disclosure, there is provided a data transmission apparatus, including: a processor, a memory and executable programs stored in the memory and capable of being executed by the processor. When the processor executes the executable programs, steps of the data transmission method in the first aspect or the second aspect are executed.

According to a fourth aspect of an example of the disclosure, there is provided a non-transitory storage medium storing executable programs. When the executable programs are executed by a processor, steps of the data transmission method in the first aspect or the second aspect are implemented.

It should be understood that the above general description and the following detailed description are exemplary and explanatory instead of limiting the examples of the disclosure.

BRIEF DESCRIPTION OF THE DRAWINGS

Accompanying drawings here, which are incorporated in and constitute a part of the specification, illustrate examples consistent with the disclosure and, together with the specification, serve to explain principles of the examples of the disclosure.

DETAILED DESCRIPTION

Examples will be described in detail, whose instances are represented in the drawings. When the following description concerns the drawings, the same reference number in different drawings denotes the same or similar element unless otherwise stated. Described implementations in the following examples do not represent all implementations consistent with the examples of the disclosure. Rather, they are examples of an apparatus and method detailed in the appended claims and consistent with some aspects of the examples of the disclosure.

Terms used by the examples of the disclosure intend to describe examples rather than intend to limit the examples of the disclosure. A singular form 'a' and 'the' used in the examples of the disclosure and the appended claims intends to include a plural form unless other meanings are set forth clearly in context It should be further understood that a term "and/or" used herein refers to and includes any one or all possible combinations of one or more associated listed items.

It should be understood that various information may be described by terms "first", "second", "third" and the like in the examples of the disclosure but is not supposed to be limited by these terms. These terms are used for distinguishing the same type of information. For example, without departing from the scope of the examples of the disclosure, first information may be called second information, similarly, second information may be also called first information. Depending on the context. "if", for example, used herein may be constructed as "when . . . " or "in response to determining".

An executive body involved in the examples of the disclosure includes but is not limited to: a network device of a wireless communication network, for example, a Wi-Fi network, for example, a network under a standard of IEEE 802.11a/b/g/n/ac and a standard of IEEE 802.11be in a next generation of Wi-Fi network. The network device includes but is not limited to: a wireless access point (AP) device such as a Wi-Fi router, a wireless station (STA), a user terminal, a user node, a mobile terminal or a tablet PC, etc.

An application scenario of the examples of the disclosure includes: under a standard of existing IEEE 802.11, data are transmitted by using a single link, that is, transmitted in one frequency band (bandwidth), resource occupying duration for a data frame during transmission is set to be a sum of transmission duration for the data frame plus Short Inter-Frame Space (SIFS) plus transmission duration for a receiving feedback information (ACK). In IEEE 802.11be, data may be transmitted by using multi-links, but the receiving feedback information is still transmitted by using a single link. If occupying duration for each of the multi-links adopts an existing standard, the resource occupying duration for each of the multi-links may include the transmission duration for ACK, however an ACK frame needs to be transmitted in only one frequency band actually, so a spectrum resource is wasted, and data transmission efficiency is lowered.

Figure 1:
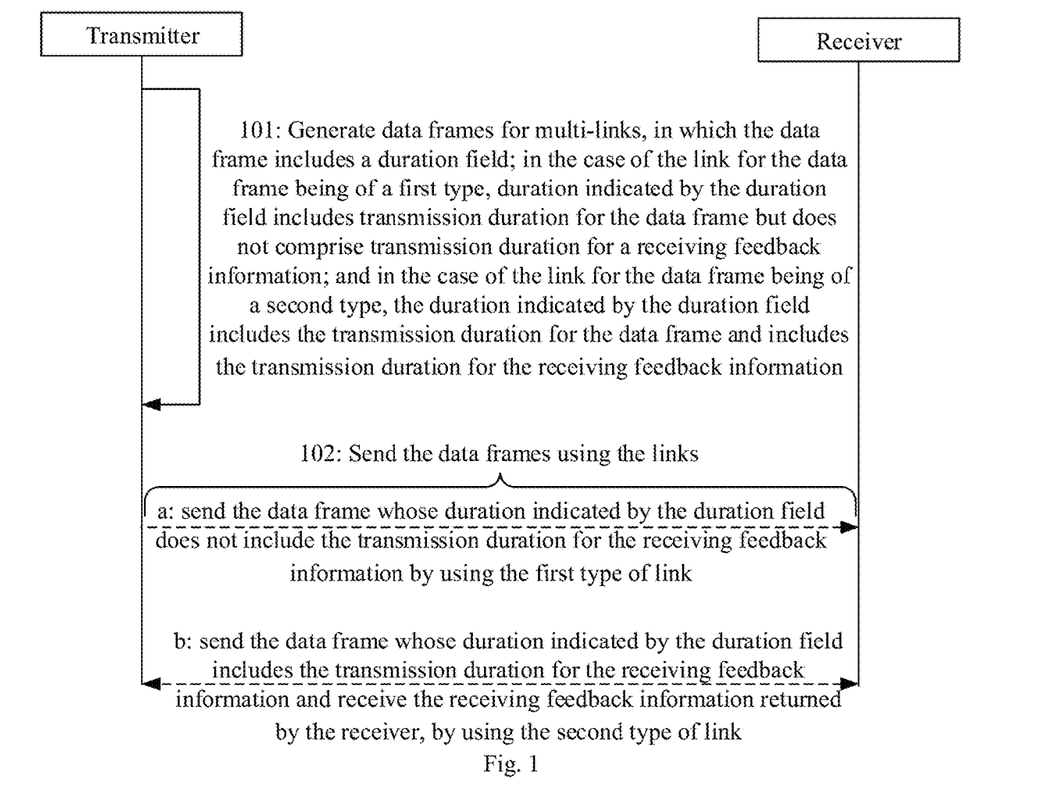
FIG. 1 is a schematic flowchart of a data transmission method according to an example.

As shown in FIG. 1, there is provided a data transmission method according to an example. The data transmission method may be applied to a transmitter of data frame in wireless communication. The data transmission method includes step 101: generating data frames for multi-links, in which the data frame includes a duration field. In the case of the link for the data frame is of a first type, duration indicated by the duration field includes transmission duration for the data frame but does not include transmission duration for a receiving feedback information. In the case of the link for the data frame is of a second type, the duration indicated by the duration field includes the transmission duration for the data frame and includes the transmission duration for the receiving feedback information. The first type of link is configured to transmit the data frame; the second type of link is configured to transmit the data frame and the receiving feedback information; and transmission frequency bands for different links are different. In step 102: sending the data frames using the links.

Wireless communication may be Wi-Fi communication adopting a standard of IEEE 802.11be, etc. The transmitter may be a Wireless Station (STA) in Wi-Fi communication, etc. The data frame may be a data frame transmitted respectively in each of the multi-links. The data frame may be a Physical Layer Protocol Data Unit (PPDU) data frame.

The transmission frequency band may be a Wi-Fi working frequency band, such as 2.4 GHZ. 5.8 GHZ and 6-7 GHZ, etc., or may be a frequency range of a bandwidth occupied by the link. The frequency range of the bandwidth occupied by each of the multi-links may belong to the same Wi-Fi working frequency band or different Wi-Fi working frequency bands.

The data frame is sent by the transmitter through the multi-links and is received by a receiver. The receiver may be a wireless station in Wi-Fi communication, etc.

The data frame may be provided with a duration field. The duration indicated by the duration field is the resource occupying duration for the link. A third end such as a wireless station except the transmitter and the receiver of the data frame will be silent within the duration indicated by the duration field of the data frame after receiving the data frame, so that data frame transmission between the transmitter and the receiver of the data frame cannot be interfered.

The first type of link may be configured to transmit the data frame and not be configured to transmit the receiving feedback information. The second type of link may be configured to transmit the data frame and the receiving feedback information. In the case that the transmitter of the data frame transmits the data frame using the multi-links, a receiving status of each of the multi-links may be feedback to the transmitter of the data frame by means of one or more pieces of receiving feedback information, and the receiving feedback information is transmitted to the transmitter of the data frame from the receiver of the data frame through the second type of link. For example, a Wi-Fi device can communicate simultaneously in three links with frequency bands of 2.4 GHZ. 5.8 GHZ and 6-7 GHZ, so the first type of link may occupy the frequency bands of 2.4 GHz and 5.8 GHZ, and the second type of link may occupy the frequency band of 6-7 GHZ.

The second type of link is configured to transmit the data frame and the receiving feedback information, so the duration indicated by the duration field includes the transmission duration for the data frame and the transmission duration for the receiving feedback information; and the duration may further include duration for Short Inter-Frame Space (SIFS) between the data frame and the receiving feedback information. The short inter-frame space is configured to space all frames in one-time data transmission, such as is configured to space the data frames, the ACK frames, etc. Relative to the short inter-frame space. Wi-Fi communication further includes an Inter-Frame Space (IFS) configured to space different data transmissions.

The first type of link is not configured to transmit the receiving feedback information, so the duration indicated by the duration field may not include the transmission duration for the receiving feedback information, as shown in step 102a of FIG. 1.

In this way, on the one hand, setting of the duration fields can meet a transmission mode that transmits the data frames using the multi-links. On the other hand, when the second type of link among the multi-links transmits the receiving feedback information, a resource occupied by the first type of link is released, resource utilization is improved, and efficiency of transmitting the data frames by the multi-links is improved.

In an example, in the case that the data frame is a unicast data frame, the transmission duration for the data frame includes transmission duration for a single unicast data frame.

In the case that the data frame is a continuous data frame, the transmission duration for the data frame includes a sum of transmission duration for n sub-data-frames contained in the continuous data frame and (n−1) short inter-frame spaces, in which n is a positive integer equal to or greater than 2, and each short inter-frame space is located between two adjacent sub-data-frames.

The data frames may include the unicast data frame and the continuous data frame. In the case that the data frame is the unicast data frame, the transmission duration for the data frame indicated by the duration field may be transmission duration for the unicast data frame. In the case that the data frame is the continuous data frame, the transmission duration for the data frame indicated by the duration field may be a sum of the transmission duration for each sub-data-frame in the continuous data frame and short inter-frame spaces between all the sub-data-frames.

In the case that the data frame is the continuous data frame, a receiving status of the continuous data frame may be fed back through block receiving feedback information.

In an example, the data frame further includes a feedback link indicating bit configured to indicate that the link for the data frame is of the first type or the second type, as shown in step 102b of FIG. 1.

The feedback link indicating bit may be set in a preset position of the data frame, and may respectively represent the first type and the second type by adopting different values.

For example, the feedback link indicating bit may occupy one bit. "0" represents that the link for the data frame is the first type, and "1" represents that the link for the data frame is the second type. Or the feedback link indicating bit may occupy one bit. "1" represents that the link for the data frame is the first type, and "0" represents that the link for the data frame is the second type.

The receiver determines that the link for the data frame sent by the transmitter is of the first type or the second type according to the feedback link indicating bit after receiving the data frame. The receiver can send the receiving feedback information for the data frame using the second type of link. The receiving status of the data frame in each of the multi-links may be fed back to the transmitter of the data frame by means of one or more pieces of receiving feedback information, and the receiving feedback information is transmitted to the transmitter of the data frame from the receiver of the data frame using the second type of link.

The feedback link indicating bit can provide an explicit link type indication, improving the efficiency of recognizing the type of the link by the receiver of the data frame, and improving transmission efficiency of data frame.

In an example, the feedback link indicating bit is located in a frame control field of the data frame; or the feedback link indicating bit is located in a physical frame header of the data frame.

The feedback link indicating bit may be located in the frame control field or in the physical frame header of the data frame. For example, in PPDU, the frame control field is generally configured to define a type, a transmission direction, etc. of PPDU. The physical frame header generally contains length information of PPDU, etc.

During sending of the data frame, the transmitter may set the feedback link indicating bit in the frame control field or in the physical frame header so as to indicate to the receiver of the data frame which of the multi-links is adopted to transmit the receiving feedback information.

The receiver receives the data frame sent by the transmitter, reads the feedback link indicating bit in the frame control field or in the physical frame header, and determines that the type of the link for the data frame is the first type or the second type.

In an example, the method further includes: determining the type of the link according to receiving and sending time of the data frame transmitted by each of the multi-links.

Figure 2A:
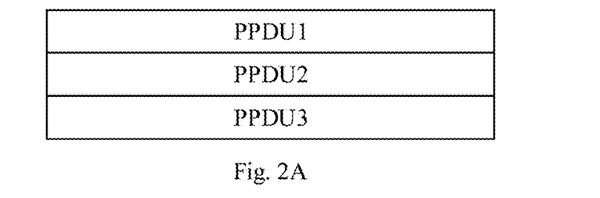
FIGS. 2A-2D are schematic diagrams of a data frame transmission mode according to an example.

Transmission of the data frame may be divided into synchronous transmission and asynchronous transmission according to the receiving and sending time of the data frame transmitted by each of the multi-links. For example, as for synchronous transmission, as shown in FIG. 2A, sending times of the data frames of each of the multi-links are the same, and arrival times when the data frames of each of the multi-links, PPDU1, PPDU2, and PPDU3, arrive at the receiver are the same. As for asynchronous transmission, as shown in FIG. 2B to FIG. 2D, there are three cases for asynchronous transmission.

Figure 2B:
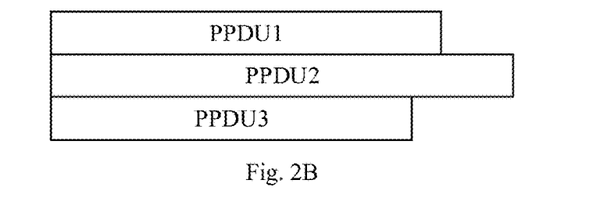

A first case is: as shown in FIG. 2B, the sending times of the data frame of each of the multi-links, PPDU1, PPDU2, and PPDU3, are the same, but the arrival times when the data frames of each of the multi-links arrive at the receiver are different.

Figure 2C:
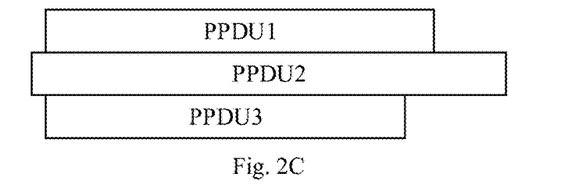

A second case is: as shown in FIG. 2C, the sending times of the data frames of each of the multi-links, PPDU1, PPDU2, and PPDU3, are different, and the arrival times when the data frames of each of the multi-links arrive at the receiver are also different.

Figure 2D:
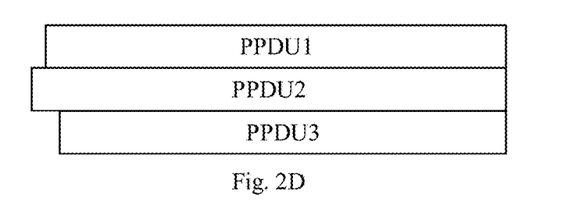

A third case is: as shown in FIG. 2D, the sending times of the data frames of each of the multi-links, PPDU1, PPDU2, and PPDU3, are different, and the arrival times when the data frames of each of the multi-links arrive at the receiver are the same. The arrival time when the data frame arrives at the receiver may be determined by the transmitter according to the sending time of the data frame, a length of the data frame, etc.

The type of the link for each data frame can be determined as the first type or the second type according to the conditions of the sending times and the arrival times of the data frames of each of the multi-links. For example, the link for a data frame arriving at the receiver at the latest can be determined to be of the second type, in this way, the receiving feedback information can contain the receiving status of all the data frames.

In an example, determining the type of the link according to the receiving and sending time of the data frames transmitted by each of the multi-links includes at least one of the following. The type of the link for a latest sent data frame is determined to be the second type in the case that the multi-links perform asynchronous transmission and the data frames transmitted by each of the multi-links arrive at the receiver at the same time.

For example, as shown in FIG. 2D, there are three data frames for asynchronous transmission and the arrival times when the three data frames arrive at the receiver are the same, so the type of the link for the latest sent data frame, namely, the type of the link for PPDU3, can be determined to be the second type, and the types of the links for the other data frames, namely, the types of the links for PPDU1 and PPDU2 are determined to be the first type.

Enough time can be provided for the receiver of the data frame to perform processing such as parsing and feedback, by determining the type of the link for the latest sent data frame to be the second type.

The type of the link for a data frame arriving at the receiver at the latest is determined to be the second type in the case that the multi-links perform asynchronous transmission and the data frames transmitted by each of the multi-links arrive at the receiver at different times.

For example, as shown in FIG. 2B and FIG. 2C, there are three data frames for asynchronous transmission and the arrival times when the three data frames arrive at the receiver are different, so the type of the link for the data frame arriving at the receiver at the latest, namely, the type of the link for PPDU2 in FIG. 2B and the type of the link for PPDU2 in FIG. 2C, can be determined to be the second type, and the types of the links for the other data frames, namely, the types of the links for PPDU1 and PPDU3 in FIG. 2B and the types of the links for PPDU1 and PPDU3 in FIG. 2C, can be determined to be the first type.

By determining the type of the link for the data frame arriving at the receiver at the latest to be the second type, on the one hand, enough time can be provided for the receiver of the data frame to perform processing such as parsing and feedback; and on the other hand, resources occupied by other links which completed transmission of data frames earlier can be released in advance, and the resource utilization is improved.

The type of the link can be determined according to a load of each of the multi-links in the case that the multi-links perform synchronous transmission.

For example, as shown in FIG. 2A, there are three data frames for synchronous transmission, that is, the sending times of the three data frames are the same, and the arrival times when the three data frames arrive at the receiver are also the same, so the type of the link can be determined according to the load of the link for the data frame. For example, the type of the link with a lowest load value is determined to be the second type.

In an example, determining the type of the link according to the load of each of the multi-links includes at least one of the following, determining the type of the link with the lowest load value to be the second type; and determining the type of the link establishing an association with a minimum number of wireless stations to be the second type.

Each of the multi-links has a load value, so the status of the load of the link can be determined by reading the load value. As transmission of the receiving feedback information needs to occupy a certain resource, the receiving feedback information can be transmitted in the link with a lowest load, in this way, the low-load link can be fully utilized, and utilization efficiency of the multi-links is improved.

The larger the number of wireless stations establishing an association with the link, the higher the probability that the link has a higher load: the smaller the number of wireless stations establishing an association with the link, the relatively lower the probability that the link has a higher load. So, the receiving feedback information can be transmitted in the link establishing an association with a minimum number of the wireless stations, increasing the probability of transmitting the receiving feedback information in the low-load link, and improving the utilization efficiency of the multi-links.

Figure 3:
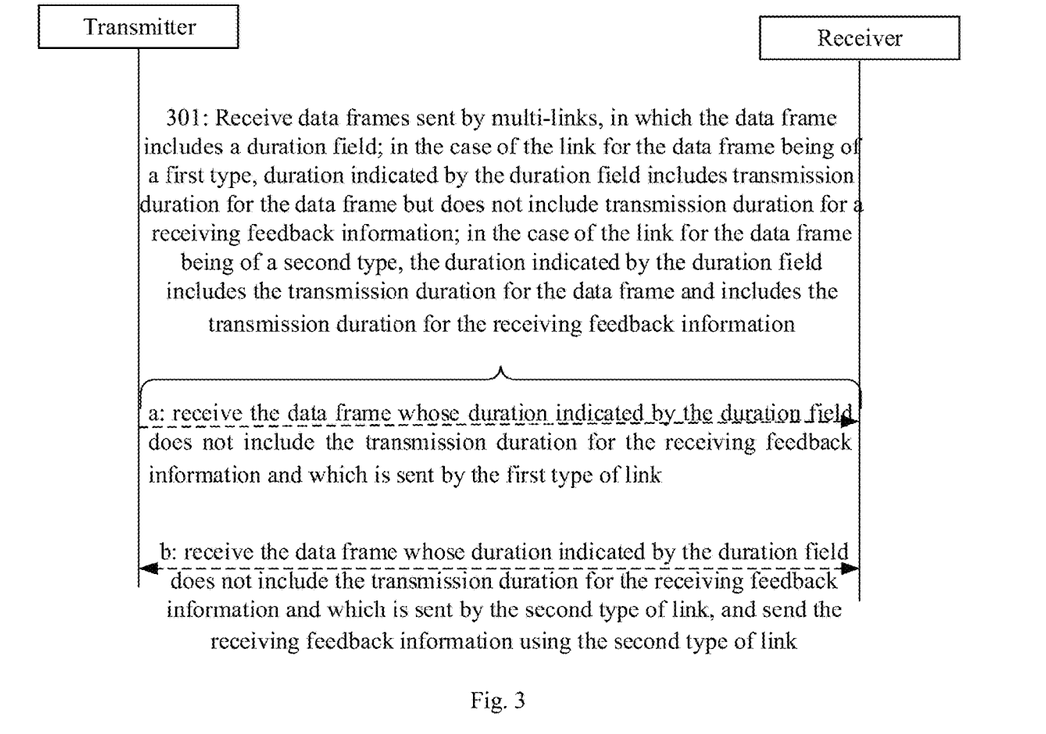
FIG. 3 is a schematic flowchart of a data transmission method according to an example.

As shown in FIG. 3, there is provided a data transmission method according to an example, which is applied to a data frame receiver in wireless communication. The data transmission method includes step 301: receiving data frames sent by multi-links. The data frame includes a duration field. In the case of the link for the data frame is of a first type, duration indicated by the duration field includes transmission duration for the data frame but does not include transmission duration for a receiving feedback information, step 301a. In the case of the link for the data frame is of a second type, the duration indicated by the duration field includes the transmission duration for the data frame and includes the transmission duration for the receiving feedback information, step 301b. The first type of link is configured to transmit the data frame; the second type of link is configured to transmit the data frame and the receiving feedback information; and transmission frequency bands for different links are different.

The wireless communication may be Wi-Fi communication adopting a standard of IEEE 802.11be, etc. The transmitter may be an STA in Wi-Fi communication, etc. The data frame may be a data frame respectively transmitted in each of the multi-links. The data frame may be PPDU.

The transmission frequency band may be a Wi-Fi working frequency band, such as 2.4 GHZ. 5.8 GHZ and 6-7 GHZ, or may be a bandwidth occupied by the link. The bandwidth occupied by each of the multi-links may belong to the same Wi-Fi working frequency band or belong to different Wi-Fi working frequency bands.

The data frames are sent by the transmitter by using the multi-links and are received by the receiver. The receiver may be a wireless station in Wi-Fi communication, etc. The data frame may be provided with the duration field. The duration indicated by the duration field is resource occupying duration for the link. A third end except the transmitter and the receiver of the data frame will be silent within the duration indicated by the duration field of the data frame after receiving the data frame, so that transmission of the data frames between the transmitter and the receiver of the data frame cannot be interfered.

The first type of link may be configured to transmit the data frame and not be configured to transmit the receiving feedback information, and the second type of link may be configured to transmit the data frame and the receiving feedback information. In the case that the transmitter of the data frame transmits the data frame by using the multi-links, a receiving status for each of the multi-links may be fed back to the transmitter of the data frame by means of one or more pieces of receiving feedback information, and the receiving feedback information is transmitted to the transmitter of the data frame from the receiver of the data frame through the second type of link. For example, a Wi-Fi device can communicate simultaneously in three links with frequency bands of 2.4 GHZ. 5.8 GHZ and 6-7 GHZ, so the first type of link may occupy the frequency bands of 2.4 GHZ and 5.8 GHZ, and the second type of link may occupy the frequency band of 6-7 GHZ.

The second type of link is configured to transmit the data frame and the receiving feedback information, so the duration indicated by the duration field includes the transmission duration for the data frame and the transmission duration for the receiving feedback information. Additionally, the duration may further include duration for short inter-frame space between the data frame and the receiving feedback information.

The first type of link is not configured to transmit the receiving feedback information, so the duration indicated by the duration field may not include the transmission duration for the receiving feedback information.

In this way, on the one hand, setting of the duration field is defined for the case of transmitting the data frames using the multi-links, and a transmission mechanism of transmitting the data frames using the multi-links is improved. On the other hand, when the second type of link among the multi-links transmits the receiving feedback information, a resource occupied by the first type of link is released, and the resource utilization is improved.

In an example, the method further includes: determining the type of the link for the data frame according to type information indicated by a feedback link indicating bit of the data frame. The feedback link indicating bit may be set in a preset position of the data frame, and may be configured to respectively represent the first type and the second type by adopting different values. For example, the feedback link indicating bit may occupy one bit. "0" represents that the link for the data frame is the first type, and "1" represents that the link for the data frame is the second type.

The receiver determines that the link for the data frame sent by the transmitter is of the first type or the second type according to the feedback link indicating bit after receiving the data frame. The receiver can send the receiving feedback information for the data frame by using the second type of link. The receiving status of the data frames in each of the multi-links may be fed back to the transmitter of the data frame by means of one or more pieces of receiving feedback information, and the receiving feedback information is transmitted to the transmitter of the data frame from the receiver of the data frame by using the second type of link.

In an example, the method further includes: in response to the feedback link indicating bit of the data frame indicating that the link for the data frame is of the second type, sending the receiving feedback information in the link for the data frame.

The receiver can send the receiving feedback information for the data frame by using the second type of link. The receiving status of the data frames in each of the multi-links may be fed back to the transmitter of the data frame by means of one or more pieces of receiving feedback information, and the receiving feedback information is transmitted to the transmitter of the data frame from the receiver of the data frame by using the second type of link.

The feedback link indicating bit can provide an explicit link type indication, improving efficiency of recognizing the type of the link by the receiver of the data frame, and improving transmission efficiency of data frames.

In an example, determining the type of the link for the data frame according to the type information indicated by the feedback link indicating bit of the data frame includes at least one of the following determining the type of the link for the data frame according to the type information indicated by the feedback link indicating bit in a frame control field of the data frame; and determining the type of the link for the data framed according to the type information indicated by the feedback link indicating bit in a physical frame header of the data frame.

The feedback link indicating bit may be located in the frame control field or in the physical frame header of the data frame. During sending of the data frame, the transmitter may set the feedback link indicating bit in the frame control field or in the physical frame header, so as to indicate to the receiver of the data frame which of multi-links is configured to transmit the receiving feedback information.

The receiver receives the data frame sent by the transmitter, reads the feedback link indicating bit in the frame control field or in the physical frame header and determines that the type of the link for the data frame is the first type or the second type.

An instance is provided below by combining any of the above examples.

1. Setting of the Duration Field of the Data Frame:

Transmission of the data frame may be divided into synchronous transmission and asynchronous transmission according to the receiving and sending time of the data frame transmitted by each of the multi-links.

For example, as for synchronous transmission, as shown in FIG. 2A, the sending times of the data frames in each of the multi-links are the same, and the times when the data frames in each of the multi-links arrive at the receiver are also the same.

As for asynchronous transmission, as shown in FIG. 2B to FIG. 2D, there are three cases for asynchronous transmission.

A first case, as shown in FIG. 2B, the sending times of the data frames in each of the multi-links are the same, but the times when the data frames in each of the multi-links arrive at the receiver are different.

A second case, as shown in FIG. 2C, the sending times of the data frames in each of the multi-links are different, and the times when the data frames in each of the multi-links arrive at the receiver are also different.

A third case, as shown in FIG. 2D, the sending times of the data frames in each of the multi-links are different, and the times when the data frames in each of the multi-links arrive at the receiver are the same.

As for the link configured to transmit an ACK frame, the duration indicated by the duration field of the transmitted data frame may be set as following: 1. as for a unicast data frame, the duration is set to be: a length of the data frame+1 SIFS+ duration for ACK; and 2. as for a continuous data frame, the duration is set to be: n*length of a sub-data-frame+ (n)*SIFS+ duration for BA, in which n is the number of sub-data-frames in the continuous data frame, and the duration for BA represents a duration for block receiving feedback information.

As for other links that are not configured to transmit the ACK frame, the duration indicated by the duration field of each of the transmitted data frames may be set as following: 1. for the unicast data frame, the duration is set to be the length of the data frame; and 2. for the continuous data frame, the duration is set to be: n*length of the sub-data-frame+ (n−1)*SIFS.

The transmitter can use one bit in the frame control field or the physical frame header in the data frame to identify whether the link is configured to transmit the ACK frame or is not configured to transmit the ACK frame.

2. Determining the Link Configured to Transmit the ACK Frame:

Each of the multi-links corresponds to different frequency bands. Under the condition that transmission of data frames is asynchronous transmission, if the sending times of the data frames are the same, a frequency band in which the data frame arrives at the receiver at the latest is configured as a frequency band for the ACK. If the data frames arrive at the receiver at the same time, a frequency band in which the data frame is transmitted at the latest is configured as the frequency band for receiving the ACK frame. If the sending times of the data frames are different and the data frames do not arrive at the receiver at the same time, a frequency band in which the data frame arrives at the receiver at the latest is configured as the frequency band for receiving the ACK frame.

Under the condition of synchronous transmission, the transmitter determines the frequency band for receiving the ACK frame according to the busyness of frequency band communication.

Figure 4:
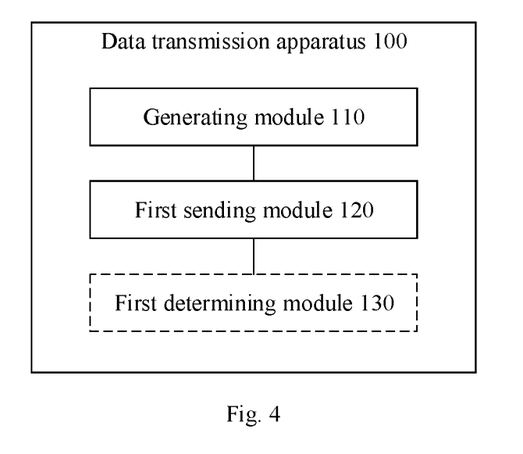
FIG. 4 is a block diagram of a data transmission apparatus according to an example.

There is further provided a data transmission apparatus according to an example of the disclosure, which is applied to a data frame transmitter in wireless communication. As shown in FIG. 4, the data transmission apparatus 100 includes a generating module 110 and a first sending module 120. The generating module 110 is configured to generate data frames for multi-links. The data frame includes a duration field.

In the case of the link for the data frame is of a first type, duration indicated by the duration field includes transmission duration for the data frame but does not include transmission duration for a receiving feedback information.

In the case of the link for the data frame is of a second type, the duration indicated by the duration field includes the transmission duration for the data frame and includes the transmission duration for the receiving feedback information.

The first type of link is configured to transmit the data frame; the second type of link is configured to transmit the data frame and the receiving feedback information; and transmission frequency bands for different links are different.

The first sending module 120 is configured to send the data frames using the links.

In an example, in the case that the data frame is a unicast data frame, the transmission duration for the data frame includes transmission duration for a single unicast data frame. In the case that the data frame is a continuous data frame, the transmission duration for the data frame includes a sum of transmission duration for n sub-data-frames contained in the continuous data frame and (n−1) short inter-frame spaces, in which n is a positive integer equal to or greater than 2, and each short inter-frame space is located between two adjacent sub-data-frames.

In an example, the data frame further includes a feedback link indicating bit configured to indicate that the link for the data frame is of the first type or the second type.

In an example, the feedback link indicating bit is located in a frame control field of the data frame, or the feedback link indicating bit is located in a physical frame header of the data frame.

In an example, as shown in FIG. 4, the apparatus 100 further includes a first determining module 130, configured to determine the type of the link according to receiving and sending time of the data frames transmitted by each of the multi-links.

Figure 5:
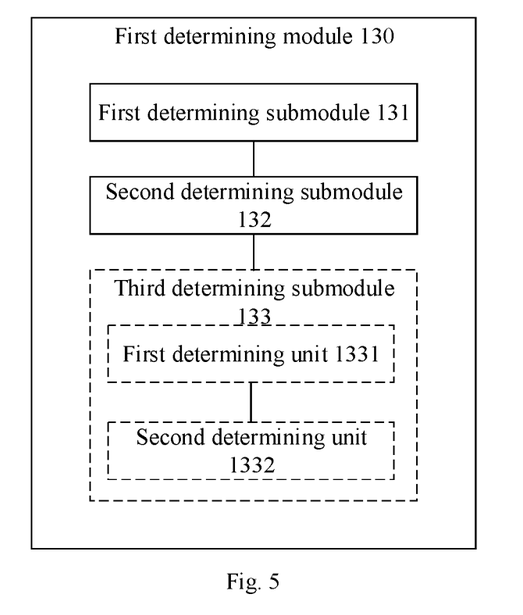
FIG. 5 is a block diagram of another data transmission apparatus according to an example.

In an example, as shown in FIG. 5, the first determining module 130 includes at least one of the following. A first determining submodule 131, configured to determine the type of the link for a latest sent data frame to be the second type in response to the multi-links performing asynchronous transmission and the data frames transmitted by each of the multi-links arriving at the receiver at the same time. A second determining submodule 132, configured to determine the type of the link for a data frame arriving at the receiver at the latest to be the second type in response to the multi-links performing asynchronous transmission and the data frames transmitted by each of the multi-links arriving at the receiver at different times. Additionally, the first determining module 130 includes a third determining submodule 133, configured to determine the type of the link according to a load of each of the multi-links in response to the multi-links performing synchronous transmission.

In an example, as shown in FIG. 5, the third determining submodule 133 includes at least one of the following: a first determining unit 1331, configured to determine the type of the link with a lowest load value to be the second type; and a second determining unit 1332, configured to determine the type of the link establishing an association with a minimum number of wireless stations to be the second type.

Figure 6:
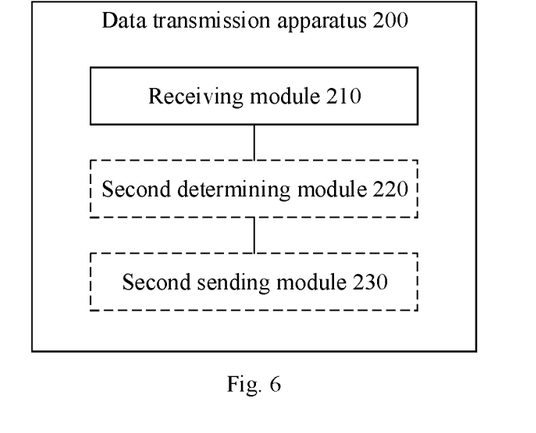
FIG. 6 is a block diagram of a data transmission apparatus according to an example.

There is further provided a data transmission apparatus according to an example of the disclosure, which is applied to a data frame receiver in wireless communication. As shown in FIG. 6, the data transmission apparatus 200 includes a receiving module 210.

The receiving module 210 is configured to receive data frames sent by multi-links. The data frame includes a duration field.

In the case of the link for the data frame is of a first type, duration indicated by the duration field includes transmission duration for the data frame but does not include transmission duration for a receiving feedback information.

In the case of the link for the data frame is of a second type, the duration indicated by the duration field includes the transmission duration for the data frame and includes the transmission duration for the receiving feedback information.

The first type of link is configured to transmit the data frame; the second type of link is configured to transmit the data frame and the receiving feedback information; and transmission frequency bands for different links are different.

In an example, as shown in FIG. 6, the apparatus 200 further includes a second determining module 220, configured to determine the type of the link for the data frame according to type information indicated by a feedback link indicating bit of the data frame.

In an example, as shown in FIG. 6, the apparatus 200 further includes a second sending module 230, configured to send the receiving feedback information in the link for the data frame in response to the feedback link indicating bit of the data frame indicating that the link for the data frame is of the second type.

Figure 7:
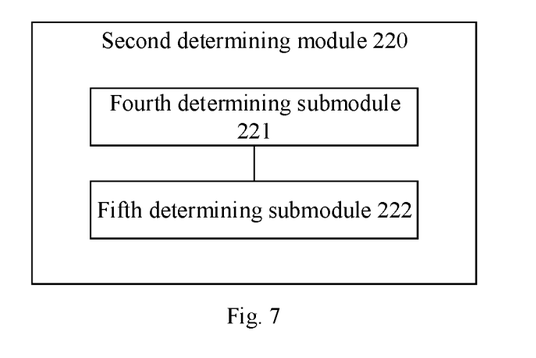
FIG. 7 is a block diagram of another data transmission apparatus according to an example.

In an example, as shown in FIG. 7, the second determining module 220 includes at least one of the following: a fourth determining submodule 221, configured to determine the type of the link for the data frame according to the type information indicated by the feedback link indicating bit in a frame control field of the data frame; and a fifth determining submodule 222, configured to determine the type of the link for the data frame according to the type information indicated by the feedback link indicating bit in a physical frame header of the data frame.

In an example, the generating module 110, the first sending module 120, the first determining module 130, the receiving module 210, the second determining module 220, the second sending module 230 and the like can be realized by one or more Central Processing Units (CPUs). Graphics Processing Unit (GPU). Baseband Processor (BP). Application Specific Integrated Circuit (ASIC). DSP. Programmable Logic Device (PLD). Complex Programmable Logic Device (CPLD). Field-Programmable Gate Array (FPGA), general-purpose processor, controller. Micro Controller Unit (MCU), microprocessor or other electronic element, so as to execute the above method.

Figure 8:
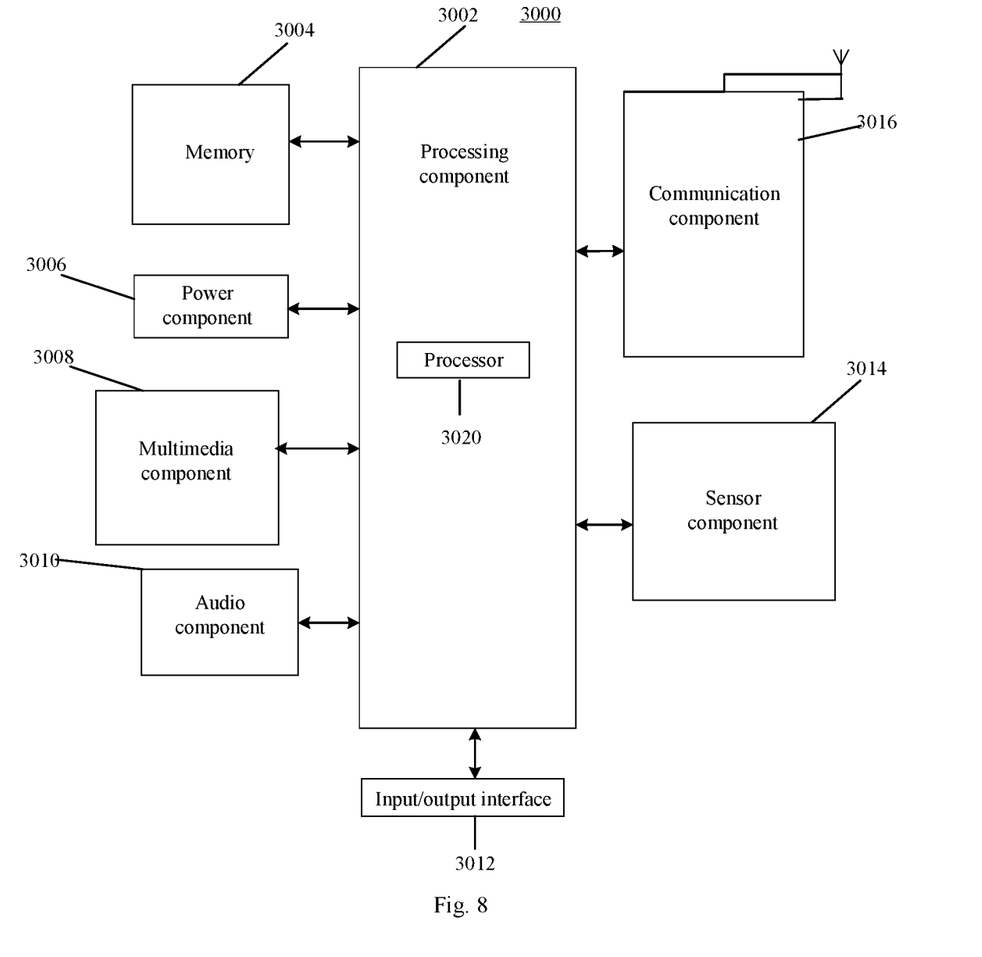
FIG. 8 is a block diagram of an apparatus for data transmission according to an example.

FIG. 8 is a block diagram of an apparatus 3000 for data transmission according to an example. For example, the apparatus 3000 may be a mobile phone, a computer, a digital broadcast terminal, a messaging device, a game console, a tablet device, a medical device, a fitness facility, a personal digital assistant, etc.

Referring to FIG. 8, the apparatus 3000 may include one or more components as follows: a processing component 3002, a memory 3004, a power component 3006, a multimedia component 3008, an audio component 3010, an input/output (I/O) interface 3012, a sensor component 3014 and a communication component 3016.

The processing component 3002 generally controls whole operation of the apparatus 3000, such as operations related to display: phone call, data communication, camera operation and recording operation. The processing component 3002 may include one or more processors 3020 for executing the instructions so as to complete all or part of steps of the above method. Besides, the processing component 3002 may include one or more modules to facilitate interaction between the processing component 3002 and the other components. For example, the processing component 3002 may include a multimedia module so as to facilitate interaction between the multimedia component 3008 and the processing component 3002.

The memory 3004 is configured to store various data so as to support operations on the apparatus 3000. Instances of these data include instructions of any application program or method for operation on the apparatus 3000, contact person data, telephone directory data, messages, pictures, videos and the like. The memory 3004 may be realized by any type of volatile or non-volatile storage device or their combination, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disc.

The power component 3006 provides power for the various components of the apparatus 3000. The power component 3006 may include a power management system, one or more power sources, and other components related to power generation, management and distribution for the apparatus 3000.

The multimedia component 3008 includes a screen which provides an output interface between the apparatus 3000 and a user. In some examples, the screen may include a Liquid Crystal Display (LCD) and a Touch Panel (TP). If the screen includes the touch panel, the screen may be realized as a touch screen so as to receive an input signal from the user. The touch panel includes one or more touch sensors so as to sense touching, swiping and gestures on the touch panel. The touch sensor can not only sense a boundary of a touching or swiping action, but also detect duration and pressure related to touching or swiping operation. In some examples, the multimedia component 3008 includes at least one of a front camera and a back camera. When the apparatus 3000 is in an operation mode, such as a photographing mode or a video mode, at least one of the front camera and the back camera can receive external multimedia data. Each front camera and each back camera may be a fixed optical lens system or have a focal length and an optical zoom capability.

The audio component 3010 is configured to output and/or input an audio signal. For example, the audio component 3010 includes a microphone (MIC). When the apparatus 3000 is in the operation mode, such as a call mode, a recording mode and a voice recognition mode, the microphone is configured to receive an external audio signal. The received audio signal may be further stored in the memory 3004 or sent via the communication component 3016. In some examples, the audio component 3010 further includes a speaker for outputting the audio signal.

The I/O interface 3012 provides an interface between the processing component 3002 and a peripheral interface module, and the peripheral interface module may be a keyboard, a click wheel, buttons and the like. These buttons may include but are not limited to: a home button, a volume button, a start button and a lock button.

The sensor component 3014 includes one or more sensors, configured to provide state evaluation of various aspects for the apparatus 3000. For example, the sensor component 3014 may detect an on/off state of the apparatus 3000 and relative positioning of the components, for example, the components are a display and a keypad of the apparatus 3000. The sensor component 3014 may further detect position change of the apparatus 3000 or one component of the apparatus 3000, whether there is contact between the user and the apparatus 3000, and an azimuth or speeding-up/speeding-down and temperature changes of the apparatus 3000. The sensor component 3014 may include a proximity sensor, configured to detect existence of a nearby object without any physical contact. The sensor component 3014 may further include an optical sensor, such as a CMOS or CCD image sensor, for use in imaging application. In some examples, the sensor component 3014 may further include an acceleration sensor, a gyroscope sensor, a magnetic sensor, a pressure sensor or a temperature sensor.

The communication component 3016 is configured to facilitate wired or wireless communication between the apparatus 3000 and the other devices. The apparatus 3000 may be accessed to a wireless network based on a communication standard, such as WiFi. 2G or 3G, or their combination. In an example, the communication component 3016 receives a broadcast signal or related broadcast information from an external broadcast management system via a broadcast channel. In an example, the communication component 3016 further includes a near-field communication (NFC) module so as to facilitate short-range communication. For example, the NFC module may be realized based on a radio frequency identification (RFID) technology, an infra-red data association (IrDA) technology, an ultra wide band (UWB) technology, a Bluetooth (BT) technology and other technologies.

In an example, the apparatus 3000 may be realized by one or more of Application Specific Integrated Circuit (ASIC). Digital Signal Processor (DSP). Digital Signal Processing Device (DSPD), Programmable Logic Device (PLD). Field-Programmable Gate Array (FPGA), controller, micro controller unit, microprocessor or other electronic element for executing the above method.

In an example, there is further provided a non-transitory computer readable storage medium including instructions, for example, a memory 3004 including the instructions. The above instructions can be executed by the processor 3020 of the apparatus 3000 so as to complete the above method. For example, the non-transitory computer readable storage medium may be an ROM, a Random Access Memory (RAM), a CD-ROM, a magnetic tape, a floppy disk, an optical data storage device and the like.

According to the data transmission method and apparatus provided by the examples of the disclosure, the data frames for the multi-links are generated, in which the data frame includes a duration field. In the case of the link for the data frame is of the first type, the duration indicated by the duration field includes the transmission duration for the data frame but does not include the transmission duration for the receiving feedback information. In the case of the link for the data frame is of the second type, the duration indicated by the duration field includes the transmission duration for the data frame and includes the transmission duration for the receiving feedback information. The first type of link is configured to transmit the data frame; the second type of link is configured to transmit the data frame and the receiving feedback information. The transmission frequency bands for different links are different; and the data frames are sent by using the links. In this way, on the one hand, setting of the duration fields can meet a transmission mode that transmits the data frames using the multi-links. On the other hand, when the second type of link among the multi-links transmits the receiving feedback information, a resource occupied by the first type of link can be released, resource utilization is improved, and efficiency of transmitting the data frames by the multi-links is improved.

Those skilled in the art will easily figure out other implementation solutions of the examples of the disclosure after considering the specification and practicing the disclosure disclosed herein. The disclosure intends to cover any variations, application or adaptive change of the examples of the disclosure which conform to general principle of the examples of the disclosure and include common general knowledge or conventional technical means which are not disclosed by the examples of the disclosure in the technical field. The specification and the examples are regarded as exemplary: the true scope and spirit of the examples of the disclosure are indicated by the following claims.

It should be understood that the examples of the disclosure are not limited to an accurate structure described above and shown in the drawings and various modifications and changes may be made without departing from its scope. The scope of the examples of the disclosure is limited by the appended claims.

What is claimed is:

1. A data transmission method, comprising:
   generating data frames for multi-links, wherein each of the data frames comprise a duration field;
   determining a type of link according to a receiving time and a sending time of each of the data frames transmitted by each of the multi-links;
   in the case of one of the multi-links for one of the data frames is a first type link, duration indicated by the duration field comprises transmission duration for the data frame but does not comprise transmission duration for a receiving feedback information;
   in the case of one of the multi-links for one of the data frames is a second type link, the duration indicated by the duration field comprises the transmission duration for the data frame and comprises the transmission duration for the receiving feedback information;
   the first type link is configured to transmit the data frame;
   the second type link is configured to transmit the data frame and the receiving feedback information; and each link of the multi-links has a different transmission frequency band; and
   sending the data frames using the multi-links.

2. The method according to claim 1, wherein:
   in the case of the data frame being a unicast data frame, the transmission duration for the data frame comprises transmission duration for a single unicast data frame; and
   in the case of the data frame being a continuous data frame, the transmission duration for the data frame comprises a sum of transmission duration for n sub-data-frames contained in the continuous data frame and (n−1) short inter-frame spaces, wherein n is a positive integer equal to or greater than 2, and each short inter-frame space is located between two adjacent sub-data-frames.

3. The method according to claim 1, wherein each of the data frames further comprise a feedback link indicating bit configured to indicate that a corresponding link for each of the data frames is of the first type link or the second type link.

4. The method according to claim 3, wherein the feedback link indicating bit is located in at least one of
   a frame control field of the data frame, or
   a physical frame header of the data frame.

5. The method according to claim 1, wherein determining the type of link according to the receiving time and the sending time comprises at least one of the following:
   determining the type of link for a latest sent data frame to be the second type link in response to the multi-links performing asynchronous transmission and the data frames transmitted by each of the multi-links arriving at a receiver at a same time;
   determining the type of link for a data frame arriving at the receiver at a most recent time to be the second type link in response to the multi-links performing asynchronous transmission and the data frames transmitted by each of the multi-links arriving at the receiver at different times; or
   determining the type of link according to a load of each of the multi-links in response to the multi-links performing synchronous transmission.

6. The method according to claim 5, wherein determining the type of link according to the load of each of the multi-links comprises at least one of the following:
   determining the type of link with a lowest load value to be the second type link; and/or
   determining the type of link establishing an association with a minimum number of wireless stations to be the second type link.

7. A data transmission method, comprising:
   receiving data frames sent by multi-links, wherein each of the data frames comprise a duration field;
   determining a type of link according to a receiving time and a sending time of each of the data frames transmitted by each of the multi-links;
   in the case of one of the multi-links for one of the data frames is a first type link, duration indicated by the duration field comprises transmission duration for the data frame but does not comprise transmission duration for receiving feedback information;
   in the case of one of the multi-links for one of the data frames is a second type link, the duration indicated by the duration field comprises the transmission duration for the data frame and comprises the transmission duration for the receiving feedback information; and
   the first type link is configured to transmit the data frame; the second type link is configured to transmit the data frame and the receiving feedback information; and each link of the multi-links has a different transmission frequency band.

8. The method according to claim 7, further comprising:
   determining the type of link for the data frame according to type information indicated by a feedback link indicating bit of the data frame.

9. The method according to claim 8, further comprising:
   sending the receiving feedback information in the link for the data frame in response to the feedback link indicating bit of the data frame indicating that a corresponding link for the data frame is of the second type link.

10. The method according to claim 8, wherein determining the type of link the for the data frame according to the type information indicated by the feedback link indicating bit of the data frame comprises at least one of the following:

determining the type of link for the data frame according to the type information indicated by the feedback link indicating bit in a frame control field of the data frame; or determining the type of link for the data frame according to the type information indicated by the feedback link indicating bit in a physical frame header of the data frame.

11. A data transmission apparatus, comprising a processor, a memory and executable programs stored in the memory and capable of being executed by the processor, wherein when the processor executes the executable programs, the processor is configured to:

generate data frames multi-links, wherein each of the data frames comprise a duration field;

determine a type of link according to a receiving time and a sending time of each of the data frames transmitted by each of the multi-links;

in the case of one of the multi-links for one of the data frames is a first type link, duration indicated by the duration field comprises transmission duration for the data frame but does not comprise transmission duration for a receiving feedback information;

in the case of one of the multi-links for one of the data frames is a second type link, the duration indicated by the duration field comprises the transmission duration for the data frame and comprises the transmission duration for the receiving feedback information;

the first type link is configured to transmit the data frame; the second type link is configured to transmit the data frame and the receiving feedback information; and each link of the multi-links has a different transmission frequency band; and send the data frames using the multi-links.

12. A non-transitory computer-readable storage medium, storing executable programs, wherein when the executable programs are executed by a processor, the data transmission method according to claim 1 is implemented.

13. The apparatus according to claim 11, wherein, in the case of the data frame being a unicast data frame, the transmission duration for the data frame comprises transmission duration for a single unicast data frame; and in the case of the data frame being a continuous data frame, the transmission duration for the data frame comprises a sum of transmission duration for n sub-data-frames contained in the continuous data frame and (n−1) short inter-frame spaces, wherein n is a positive integer equal to or greater than 2, and each short inter-frame space is located between two adjacent sub-data-frames.

14. The apparatus according to claim 11, wherein each of the data frames further comprise a feedback link indicating bit configured to indicate that a corresponding link for each of the data frames is of the first type link or the second type link.

15. The apparatus according to claim 14, wherein the feedback link indicating bit is located in at least one of a frame control field of the data frame, or a physical frame header of the data frame.

16. The apparatus according to claim 11, wherein the processor is further configured to perform at least one of the following:

determining the type of link for a latest sent data frame to be the second type link in response to the multi-links performing asynchronous transmission and the data frames transmitted by each of the multi-links arriving at a receiver at a same time;

determining the type of link for a data frame arriving at the receiver at a most recent time to be the second type link in response to the multi-links performing asynchronous transmission and the data frames transmitted by each of the multi-links arriving at the receiver at different times; or determining the type of link according to a load of each of the multi-links in response to the multi-links performing synchronous transmission.

17. A data transmission apparatus, comprising a processor, a memory and executable programs stored in the memory and capable of being executed by the processor, wherein when the processor executes the executable programs, the data transmission method according to claim 8 is executed.

18. A non-transitory computer-readable storage medium, storing executable programs, wherein when the executable programs are executed by a processor, the data transmission method according to claim 7 is implemented.

* * * * *

UNITED STATES PATENT AND TRADEMARK OFFICE
CERTIFICATE OF CORRECTION

PATENT NO. : 12,232,153 B2
APPLICATION NO. : 17/641748
DATED : February 18, 2025
INVENTOR(S) : Xiandong Dong Page 1 of 1

It is certified that error appears in the above-identified patent and that said Letters Patent is hereby corrected as shown below:

On the Title Page
On Page 2, in Item (56), under "OTHER PUBLICATIONS", in Column 2, Line 7, delete "Wkshps," and insert -- Wkshps), --, therefor.

In the Specification
In Column 1, Line 51, delete "frame:" and insert -- frame; --, therefor.
In Column 2, Line 5, delete "frame:" and insert -- frame; --, therefor.
In Column 3, Line 1, delete "context It" and insert -- context. It --, therefor.
In Column 3, Line 13, delete "context." and insert -- context, --, therefor.
In Column 4, Line 2, delete "2.4 GHZ. 5.8 GHZ and 6-7 GHZ," and insert -- 2.4 GHZ, 5.8 GHz and 6-7 GHz, --, therefor.
In Column 4, Line 27, delete "feedback" and insert -- fed back --, therefor.
In Column 4, Line 34, delete "2.4 GHZ. 5.8 GHZ and 6-7 GHZ," and insert -- 2.4 GHz, 5.8 GHz and 6-7 GHz, --, therefor.
In Column 4, Lines 35-36, delete "5.8 GHZ," and insert -- 5.8 GHz, --, therefor.
In Column 4, Line 37, delete "6-7 GHZ." and insert -- 6-7 GHz. --, therefor.
In Column 4, Line 48, delete "space." and insert -- space, --, therefor.
In Column 5, Line 30, delete "bit." and insert -- bit, --, therefor.
In Column 5, Line 33, delete "bit." and insert -- bit, --, therefor.
In Column 6, Lines 48-52, delete "The type . . . . time." and insert the same at Line 49, as a new paragraph.
In Column 7, Line 49, delete "load:" and insert -- load; --, therefor.
In Column 8, Line 15, delete "2.4 GHZ. 5.8 GHZ and 6-7 GHZ," and insert -- 2.4 GHz, 5.8 GHz and 6-7 GHz, --, therefor.
In Column 8, Line 44, delete "2.4 GHZ. 5.8 GHZ and 6-7 GHZ," and insert -- 2.4 GHz, 5.8 GHz and 6-7 GHz, --, therefor.
In Column 8, Lines 45-46, delete "2.4 GHZ and 5.8 GHZ," and insert -- 2.4 GHz and 5.8 GHz, --, therefor.

Signed and Sealed this
Twenty-seventh Day of May, 2025

Coke Morgan Stewart
*Acting Director of the United States Patent and Trademark Office*